(No Model.)

W. R. McCRACKEN.
ANIMAL TRAP GUARD.

No. 360,235. Patented Mar. 29, 1887.

WITNESSES:
Donn Twitchell.
C. Sedgwick

INVENTOR:
W. R. McCracken
BY Munn & Co.
ATTORNEYS.

United States Patent Office.

WILLIAM R. McCRACKEN, OF BRADY, OHIO.

ANIMAL-TRAP GUARD.

SPECIFICATION forming part of Letters Patent No. 360,235, dated March 29, 1887.

Application filed July 6, 1886. Serial No. 207,254. (No model.)

*To all whom it may concern:*

Be it known that I, WILLIAM R. McCRACKEN, of Brady, in the county of Guernsey and State of Ohio, have invented new and Improved Trap-Guards, of which the following is a full, clear, and exact description.

My invention relates to an improvement in traps, and has for its object to prevent the animals caught therein from gnawing themselves loose.

It consists in combining with the jaws of a trap outside their engaging-edges outwardly-extending guards concentric therewith.

Reference is to be had to the accompanying drawings, forming a part of this specification, in which similar letters of reference indicate corresponding parts in all the figures.

Figure 1:
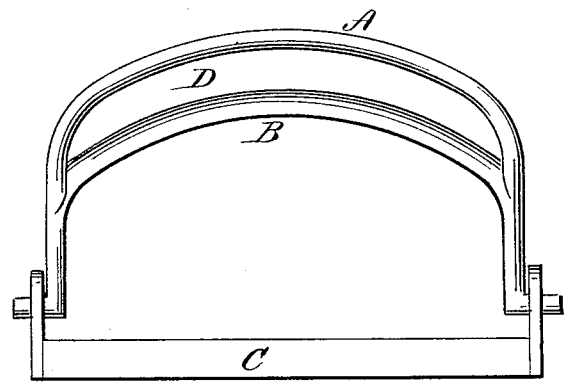
Figure 2:
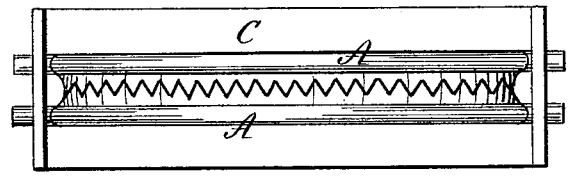
Figure 3:
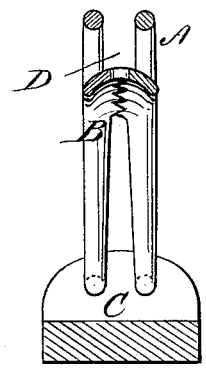

Figure 1 is a side elevation of the jaws of a trap with my improvement attached; Fig. 2, a plan view of the same, and Fig. 3 a transverse vertical section thereof.

It is frequently found that animals when caught in the jaws of a trap gnaw themselves loose, leaving therein a portion of the entrapped part. While not the practice of all animals, it is particularly true of animals of an amphibious nature. It is also found that if caught in two places they will sever the limb at the part where the pressure, and consequently the pain, is greatest.

As many valuable animals effect their escape in this manner, I have sought to provide a remedy in the form of the guards A, made integral with the jaws B B of the trap C. The said guards A, extending outwardly from the upper sides of the jaws B, and curving concentric therewith, form a space, D, between the upper side of the jaws and the under side of the guards.

The guards A are distanced upon the jaws B B sufficiently outside the engaging-edges of the same, that when the jaws close upon the animal caught therein the guards above it will barely touch the wounded part, for should the pressure of the guards be painful the animal would gnaw at that point. The pain, however, being below the guards at the intersecting jaws, the animal will endeavor to release himself just above them. The attempt, however, is frustrated through the medium of the said guards, as the space D between the guards and upper side of the jaws is not sufficient to admit of any available effort in that direction.

Having thus fully described my invention, I claim as new and desire to secure by Letters Patent—

The combination, with the toothed jaws B, of the guards A, of less width than the jaws, extending above and in alignment with the same, substantially as shown and described, whereby an open space is left between said guards over the teeth of the said jaws, as set forth.

WILLIAM R. McCRACKEN.

Witnesses:
J. E. LAWRENCE,
ELZA TURNER.